United States Patent
Hurlstone et al.

(10) Patent No.: US 6,966,830 B2
(45) Date of Patent: Nov. 22, 2005

(54) DEVICE FOR VENTILATION AND/OR AIR CIRCULATION

(75) Inventors: Chris Hurlstone, Newport (GB); Mark Anthony Di Cioccio, Felsham (GB)

(73) Assignee: Flettner Ventilator Limited, London (GB)

(*) Notice: Subject to any disclaimer, the term of this patent is extended or adjusted under 35 U.S.C. 154(b) by 235 days.

(21) Appl. No.: 10/468,169

(22) PCT Filed: Feb. 15, 2002

(86) PCT No.: PCT/GB02/00689

§ 371 (c)(1),
(2), (4) Date: Aug. 14, 2003

(87) PCT Pub. No.: WO02/065024

PCT Pub. Date: Aug. 22, 2002

(65) Prior Publication Data

US 2004/0072531 A1 Apr. 15, 2004

(30) Foreign Application Priority Data

Feb. 15, 2001 (GB) .............................. 0103781

(51) Int. Cl.⁷ .............................................. F24F 7/007
(52) U.S. Cl. ........................ 454/251; 454/254; 417/363
(58) Field of Search ................................ 454/251, 254, 454/234, 338; 417/328, 321, 363

(56) References Cited

U.S. PATENT DOCUMENTS

| | | | |
|---|---|---|---|
| D118,851 S | | 2/1940 | Demuth |
| D149,949 S | | 6/1948 | Kennedy |
| 4,044,750 A | * | 8/1977 | Zeigler ..................... 126/25 B |
| 4,123,968 A | * | 11/1978 | Malott ........................ 454/354 |
| 4,145,961 A | | 3/1979 | Lolli |
| D259,208 S | | 5/1981 | McCullough |
| 4,641,571 A | | 2/1987 | Anderson et al. |
| RE34,334 E | * | 8/1993 | Chaney ....................... 454/210 |
| D428,484 S | | 7/2000 | Zirk |
| D453,960 S | | 2/2002 | Shelby et al. |
| D471,624 S | | 3/2003 | Hurlstone et al. |
| D471,971 S | | 3/2003 | Hurlstone et al. |

FOREIGN PATENT DOCUMENTS

| | | |
|---|---|---|
| DE | 175 820 | 10/1906 |
| DE | 521 795 | 3/1993 |
| GB | 295 019 | 10/1929 |
| GB | 1 518 151 | 7/1978 |
| GB | 1 523 406 | 8/1978 |
| GB | 2 081 882 | 2/1982 |
| GB | 2 293 414 | 3/1996 |

OTHER PUBLICATIONS

Copy of International Search Report dated Jun. 6, 2002 (4 pages).
Copy of United Kingdom Search Report dated Sep. 11, 2001 (1 page).
Product literature for Flettner "TCX" ventilator, date unknown. Four (4) sheets.
Web pages re "INVERTEC" Low Voltage Lighting, G & C Systems, date unknown. Four (4) sheets. www.gnc-systems.com/210e.htm.
Web pages re Ventilation by NIDRO, date unknown. two (2) sheets. www.nidro.com/enventilatie.htm.
Product literature for Weston Body Hardware Rotary Ventilator & Grille, date unknown. One (1) sheet.
Product literature for SORTIMO ventilation system, date unknown. Two (2) sheets.
Product literature for Pacet's Superslim, 1998–1999. Twenty-one (21) sheets.
Photographs of Flettner "2000", date unknown. Five (5) sheets.
Photographs of "UBS" product, date unknown. Six (6) sheets.

* cited by examiner

Primary Examiner—Derek S. Boles
(74) Attorney, Agent, or Firm—Flynn, Thiel, Boutell & Tanis, P.C.

(57) ABSTRACT

A device comprising a rotor and fan rotatably mounted on a shaft which is rigidly fixed relative to a vehicle surface. The device is fixable on a vehicle surface by means of two clamping portions which are moveable towards each other along the shaft to press against a surface between them.

23 Claims, 9 Drawing Sheets

DEVICE FOR VENTILATION AND/OR AIR CIRCULATION

The present invention is concerned with a device for fanning or ventilating, and a method of fixing such a device.

GB-A-2 081 882 describes a ventilator operating on the Savonius principle whereby a vertical axis wind powered rotor, consisting of two oppositely directed vanes formed by overlapping and inter-connected half-cylindrical surfaces, drives a centrifugal fan located beneath it. The ventilator includes a shaft rotatably mounted on a base which is fixed to, for example, a vehicle roof. A rotor capable of being rotated by moving air drives a centrifugal fan which is rigidly fixed to the rotor. Both the rotor and fan are rigidly fixed to the shaft and rotate together relative to the, say, vehicle roof, as wind or air impacts on the rotor.

Air movement relative to the rotor therefore drives the fan which can be used to help air circulation in a space below the rotor or below the surface on which the ventilator is mounted, or to extract air through an opening in the surface to provide forced ventilation.

Fitting the known Savonius type ventilators (such as that of GB-A-2 081 882) is a time consuming task. A large circular hole and four smaller holes must be made in the, say, vehicle roof to accommodate the ventilation body and fixing bolts. The ventilator must then be disassembled before being reassembled in the opening. A base element is fixed to the roof using fasteners of bolts passing through the roof and base element. The roof sub-assembly is then fixed to the base element. Because the rotor sub-assembly of the known Savonius ventilators is of a considerably larger diameter than the base through which the fasteners or fixing bolts are passed, and overlaps the base, it is necessary to complete fixing of the base element onto the vehicle roof before attaching the rotor sub-assembly. In the known ventilators this needs to be done using a fastener accessed through the top of the rotor which results in two disadvantages:

Firstly, the need for access to the fastener from the top of the rotor means that there must be a hole or channel in the top of the rotor. Even if this is provided with a cap or lid, water ingress through the top of the rotor can arise and result in possible corrosion of components such as bearings.

Secondly, the use of a fastener accessible from the top of the rotor means that the ventilator can be removed from outside the vehicle and the hole or opening to the inside of the vehicle accessed. This can be a security risk.

A device for ventilation and/or air circulation comprising a fan, a rotor capable of being rotated by moving air for driving the fan and a fixing portion for fixing the device to a mounting surface, wherein the fixing portion comprises co-operating upper and lower clamping portions for respectively clamping above and below the mounting surface, the clamping portions being movable relative to each other to clamp or release a surface between them, and each comprising a hub portion connected by spoke elements to a peripheral clamping surface, and the fixing portion also comprising a clamping element passing through the respective hub portions for applying a clamping force to press the peripheral clamping surfaces about the mounting surface.

Preferred embodiments of the invention include a shaft which may be rigidly fixed to a surface such as a vehicle roof and about which a rotor and fan rotate.

Preferably, the fixing portion comprises co-operating upper and lower clamping portions for respectively clamping above and below a surface, the clamping portions having substantially central co-operating bores for receiving a common shaft or bolt and the clamping portions being moveable relative to each other to clamp or release a surface between them.

The use of a clamping arrangement allows one to simplify the fitting of the device and allow for relatively quick and easy fitting.

The use of a clamping or fastening element passing through hubs means that installation can be carried out quickly by one installer. The known arrangements require two; one on the roof tightening the fasteners and one inside the vehicle securing the securing nuts.

The arrangement of claim 1 allows one to have a single central fastener which has advantages.

The use of a single fastening element compared with four on the known arrangements means that installation can be carried out more quickly, reducing fitting costs, and simply.

The use of a single fastener makes it more difficult for an operator to install the ventilator incorrectly, for example by neglecting to include all four fasteners.

The use of a fastener passing through hubs on the clamping portion ensures a uniform clamping force around the periphery of the clamping portions, compared with the known arrangements where the clamping force is dependent on the relative tightness of each of the four individual fasteners.

Preferably, the shaft around which the rotor and fan rotate is rigidly mountable in and through the co-operating bores of the clamping portions.

This allows one to directly and easily mount the shaft to the clamping portions and use the shaft to couple the clamping portions.

Preferably, the clamping portions are lockable into position using a locking element acting on the lower end of the common shaft or bolt. This allows one to fasten the device from inside the space being ventilated and thereby prevents tampering of the locking element from outside as well as protecting the locking element from the elements. Locking from the inside also makes the device more secure; it can only be removed from the inside of, say, a vehicle.

In a possible embodiment of the invention, the fan and rotor are fixed relative to each other, preferably by being formed as a single piece or sub-assembly.

Preventing relative rotation between the rotor and fan simplifies the ventilator construction and making a single piece rotor and fan assembly is a particularly simple way of fixing the rotor and fan to each other.

In an alternative embodiment, the fan and-rotor are coupled by a gearing arrangement.

The inventors have established that the torque generated by the rotor at, say, a given wind speed is typically more than sufficient to drive the fan at that rate of rotation.

The rate of air extraction or circulation at a given wind/vehicle speed can therefore be increased by the use of gearing. Linking rotor and fan elements of the device through a gearing arrangement could cause the fan to rotate at a greater angular velocity than the rotor, hence improving extraction velocity at a given rotor angular velocity. The gearing ratio can be optimised for different operating applications or environments.

Preferably, the rotor comprises a base plate, an air scoop extending upwardly from the base plate comprising two curved rotor blades in spaced overlapping relation with their concave or partly concave surfaces in opposition to define a non-linear passage between the rotor blades.

Preferred embodiments of the invention will now be described to FIGS. 1 to 9.

Figure 1:
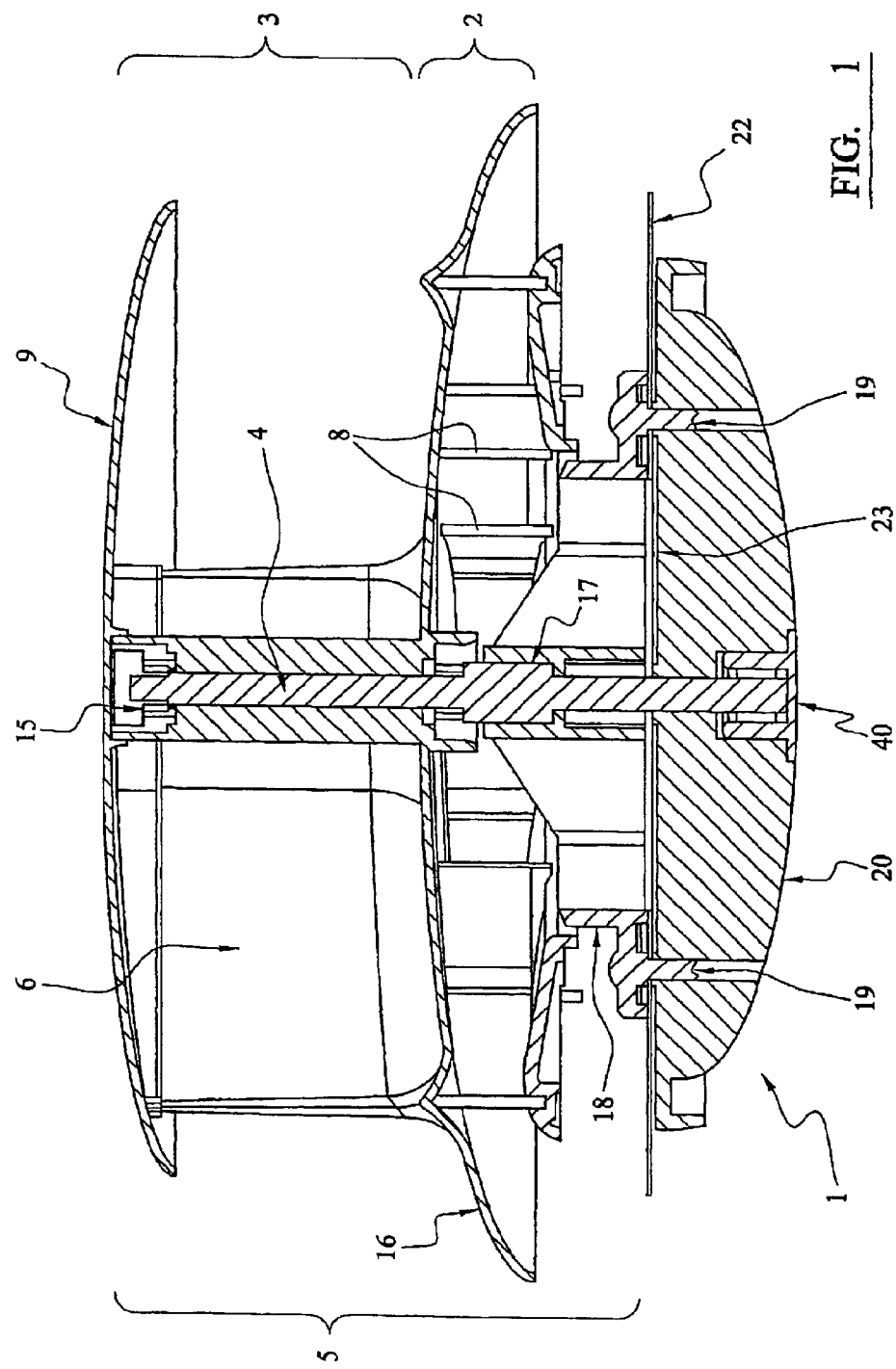
FIG. 1 is a cross-sectional view through an embodiment of a ventilator according to the present invention.

A device 1 for moving air includes a fan 2 and a rotor 3 mounted on a shaft 4.

The rotor 3 and fan 2 can be made as a single housing or fan assembly 5. Alternatively, the top disc component of the rotor 3 can be manufactured as a separate component attached to the rotor by hot plate, welding, ultrasonic welding, bonding, snap-fitting or some other means.

Figure 3:
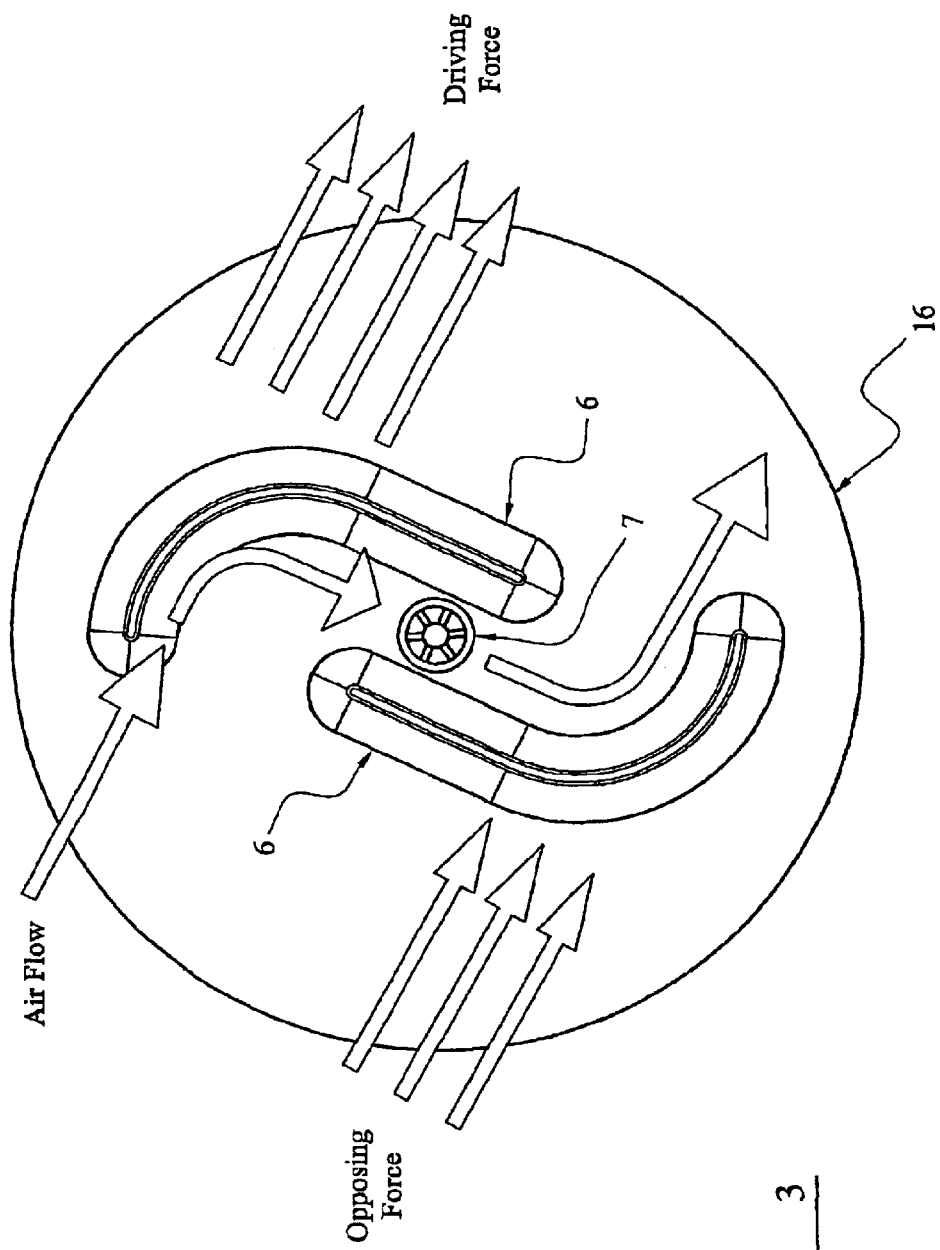
FIG. 3 is a schematic sectional illustration of air flow against the rotor of FIG. 1.
Figure 4A:
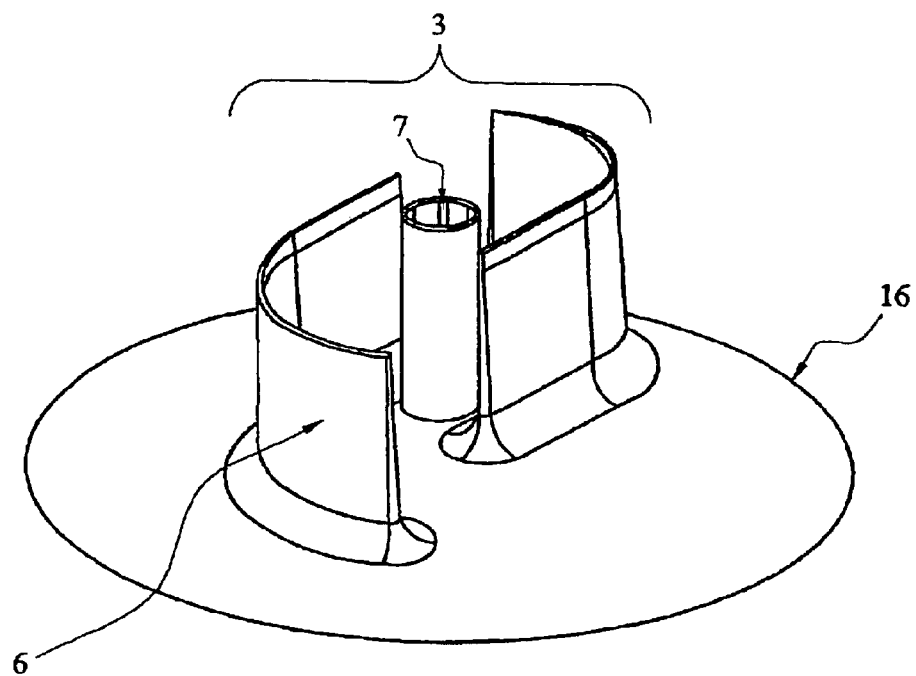
FIGS. 4a and 4b are top and bottom views respectively of the rotor (with its top plate or cover disc removed) illustrating the construction of the rotor and fan sub-assembly of the device of FIG. 1.
Figure 4B:
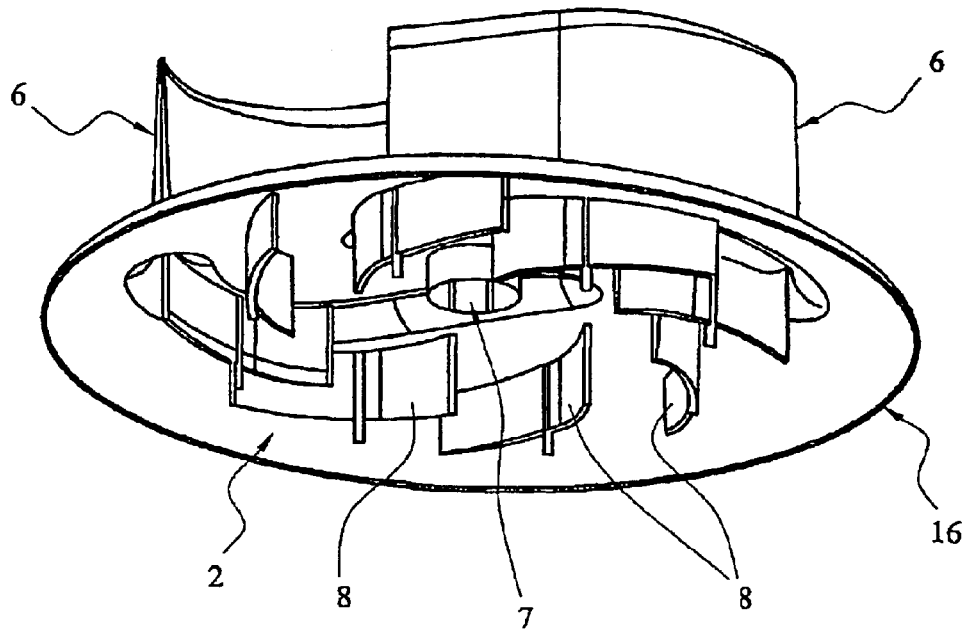
Figures 5A, 5B:
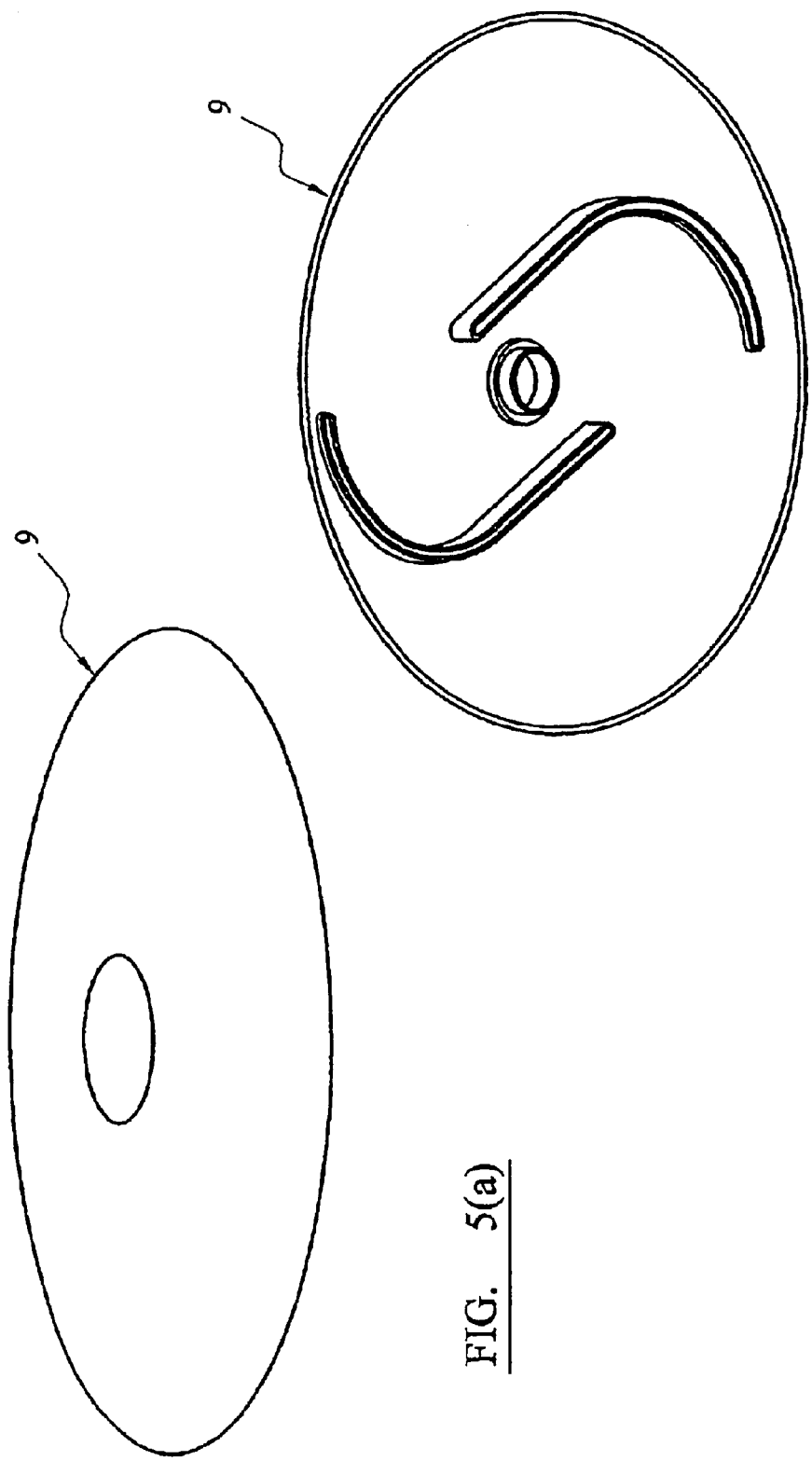
FIG. 5a and 5b illustrate too and bottom views respectively of the top plate or cover disc of the device of FIG. 1.
Figure 6A:
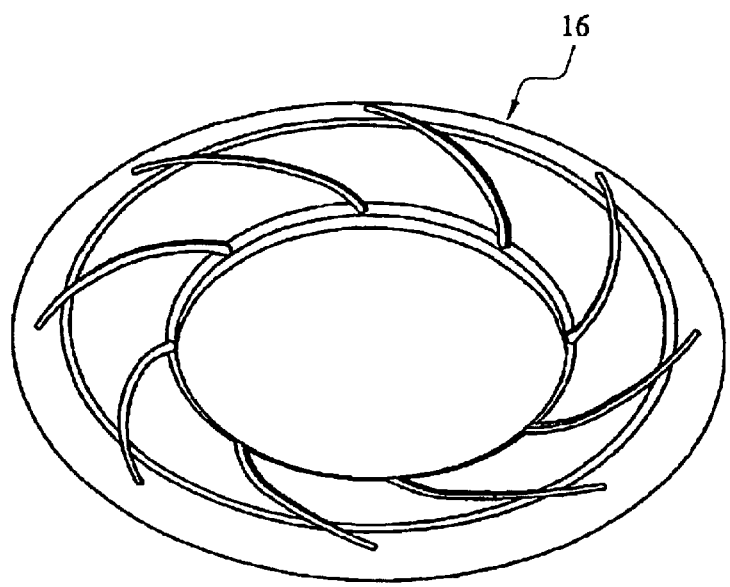
FIGS. 6a and 6b illustrate top and bottom views respectively of the fan shroud of the device of FIG. 1.
Figure 6B:
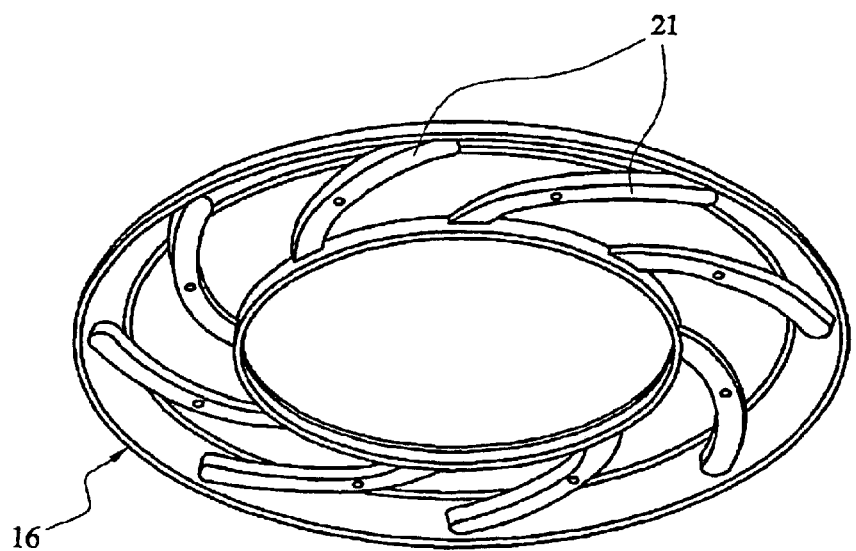
Figure 7A:
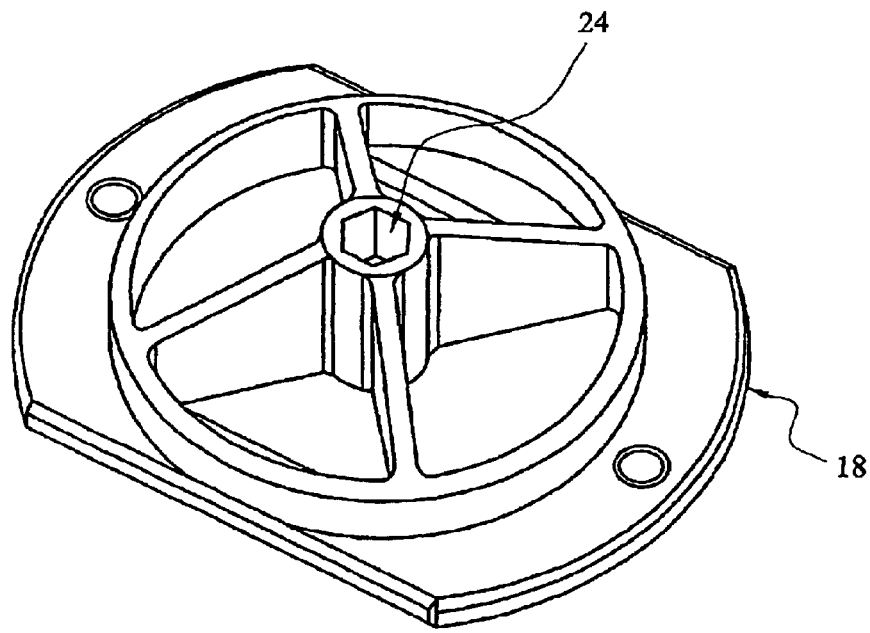
FIGS. 7a and 7b are top and bottom views respectively of the device base of FIG. 1.
Figure 7B:
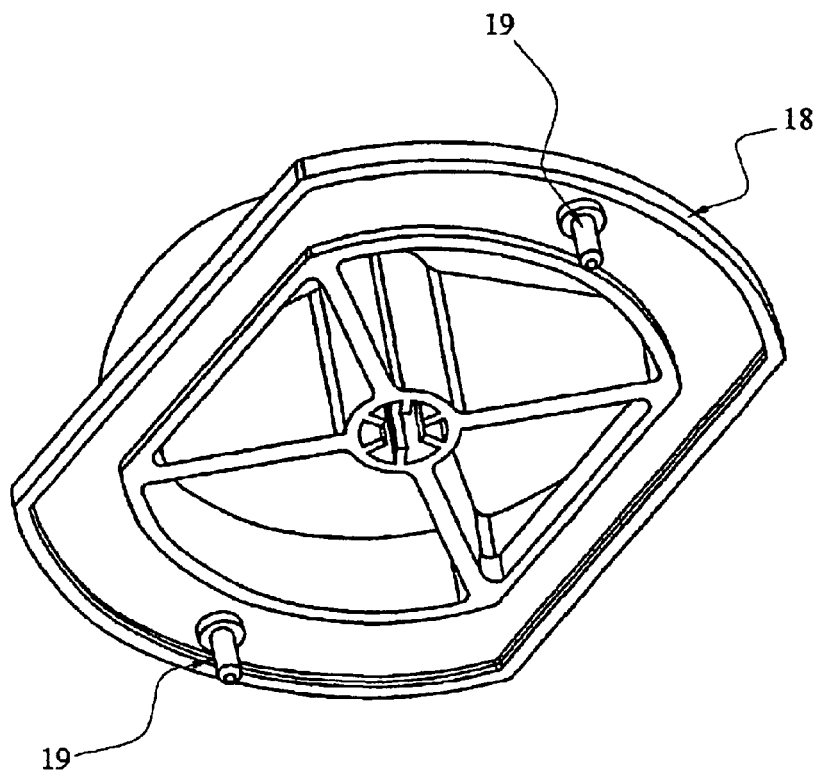
Figure 8:
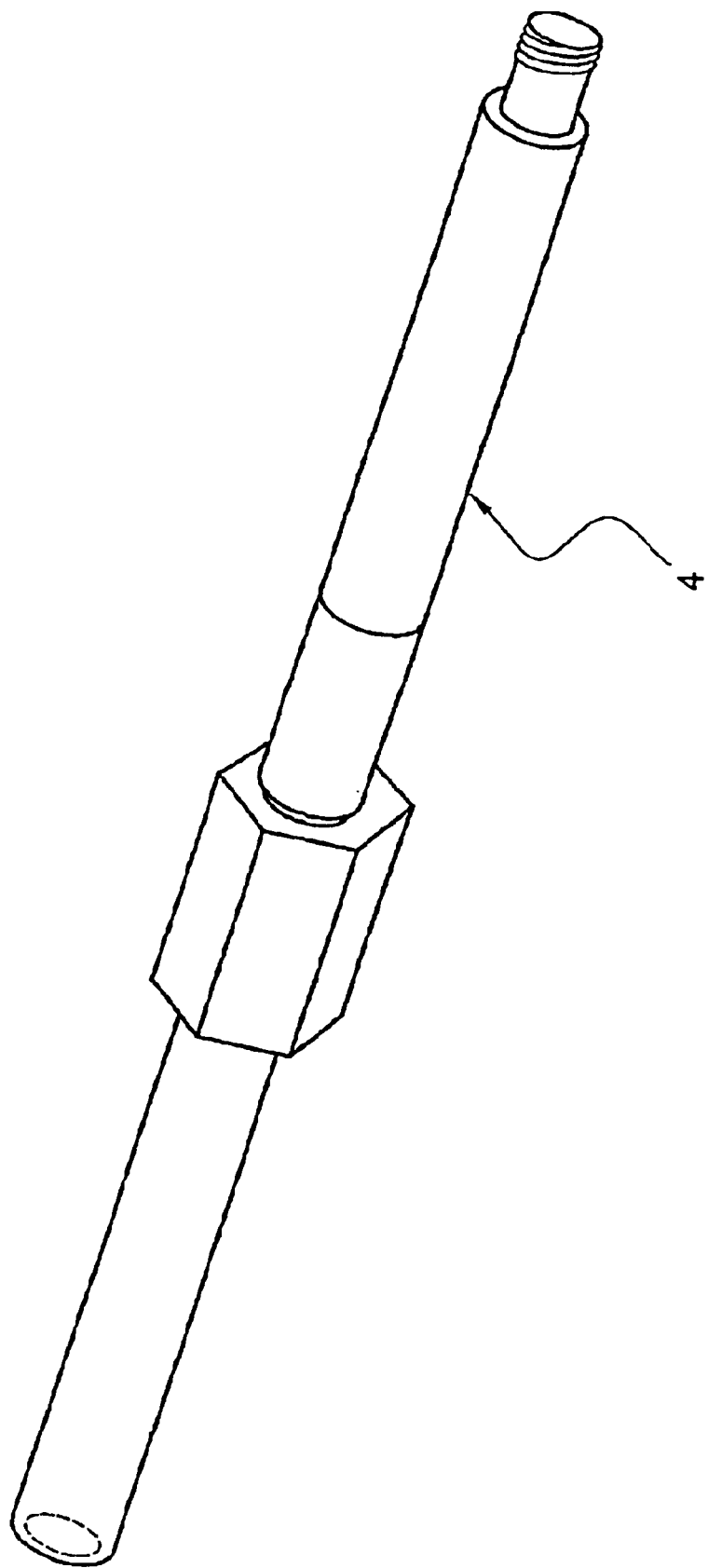
FIG. 8 illustrates the shaft of the device of FIG. 1.
Figure 9A:
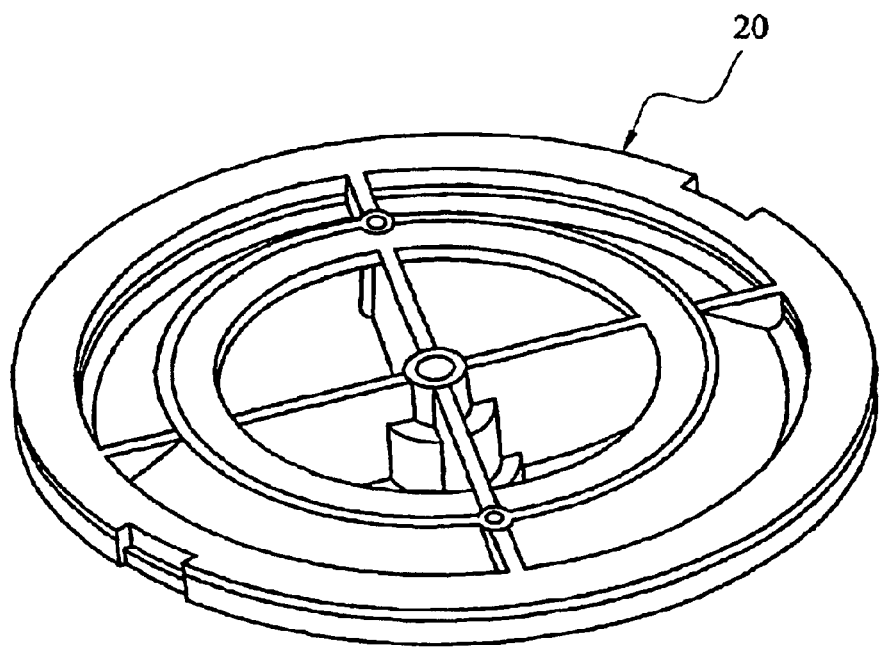
FIGS. 9a and 9b illustrate top bottom views respectively of the lower clamping portion of the device of FIG. 1.
Figure 9B:
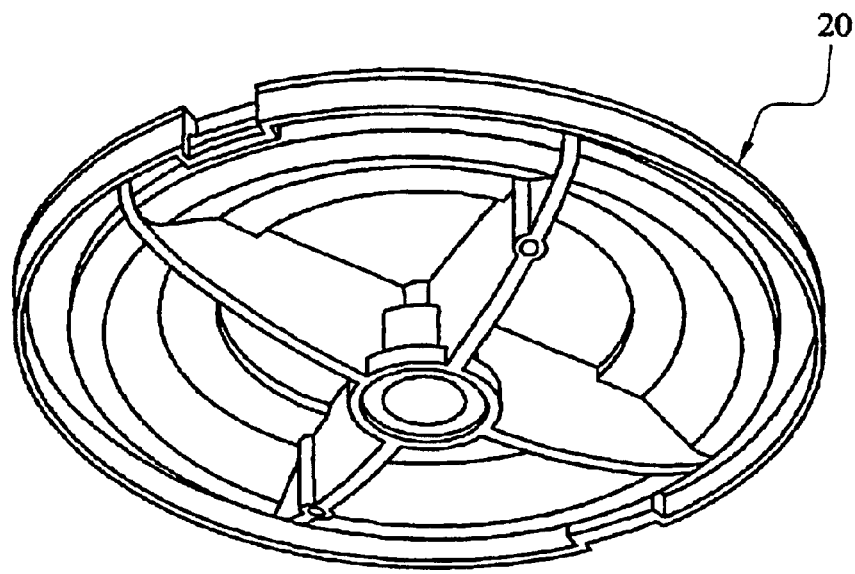

The rotor is formed by two arcuate or curved rotor blades 6 arranged around a central bore or hole 7 for receiving the shaft 4. The rotor blades 6 define a curved or S-shaped passage for air moving relative to the rotor. As shown in FIG. 3, when the rotor 3 moves relative to the air (by, movement of the surface on which the rotor is mounted, movement of air relative to a stationary rotor or a combination of the two), the air impinges on the internal rotor wall of a blade 6 and creates a torque on the rotor. This causes the rotor 3 to rotate about the shaft 4. The fan 2 (see FIG. 4) forms part of the housing 5 of which the rotor is also part and is therefore rigidly mounted to the rotor 3 and rotates therewith about the shaft 4.

The fan 2 is a centrifugal fan. It is a rotating fan which takes air in axially and expels it radially; i.e. it takes air from below the fan and rotor sub-assembly and expels it to the side of the fan.

Figure 2:
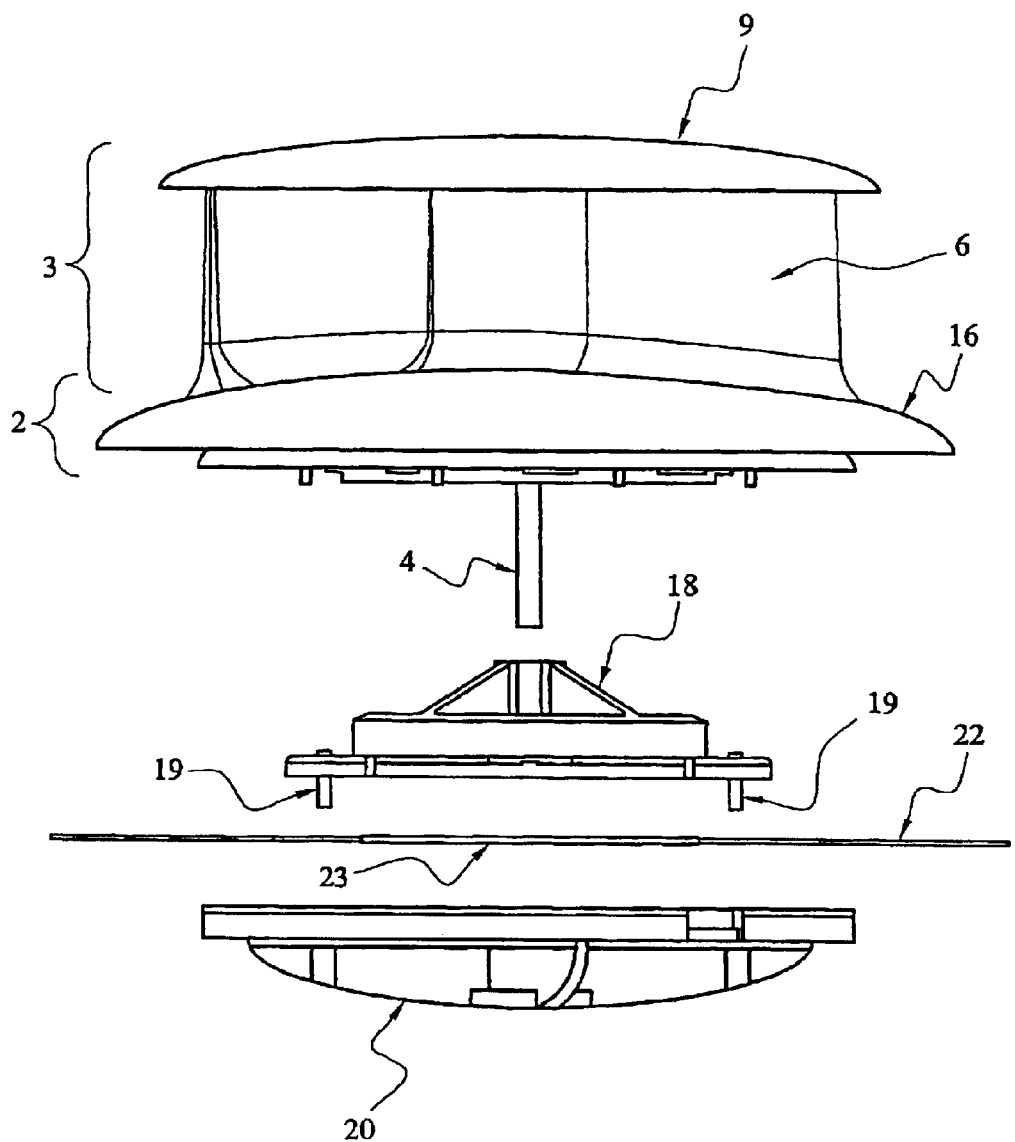
FIG. 2 is an exploded cross-sectional view of the device of FIG. 1 taken through a section at about 9020 to that of FIG. 1.

A domed top disc plate 9 is located above the rotor blades 6 and can be formed either as part of the rotor moulding or as a separate component which is then fixed to the rotor. The cover plate 9 is a flat or slightly curved top dismounted on top of the rotor 3. The edge thickness of the disc 9 is roughly equal to the typical wall thickness of the rotor component and the radius of the disc is slightly larger than the distance from the centre of the shaft above bore 7 to the outer edge of the rotor (see FIG. 2)

The fan 2 is a centrifugal fan made up of a number of blades 8 integrally formed in the base of the housing 5 and projecting therefrom in spaced relation from each other around the housing bore 7 through which the shaft 4 passes. The fan shown in FIG. 4 has eight blades; other numbers of blades may also be used.

The underside of the fan shroud 16 includes grooves 21 suited to the profile and position of the fan blades 8 and in which the fan blades 8 (see FIGS. 2) are located. The shroud is fitted over the fan blades and fastened to the fan and rotor sub-assembly 11 by heat staking, heat sealing or some other suitable method. The shroud 16 reduces the potential for leakage across the fan blade edges. Such leakage can be detrimental to fan performance.

Prior to the fixing of the top disc, the rotor is mounted on the shaft 4 via two bearings around which it may rotate freely. The uppermost bearing is secured in place by, for example, example, a circlip 15 (a small "C" shaped ring which snaps into a groove in a shaft to retain items—in this case bearings—pushed onto the shaft).

The bearing housing includes two bearings to allow rotation of the shaft 4 relative to the bearing housing 17. The bearing housing 17 is rigidly fixed to the fan and rotor sub-assembly by bonding, heat sealing or some other suitable method:

In order to fix the device to, say, a vehicle roof 22 (see FIGS. 1 and 2), an opening 23 is cut in the vehicle roof 22 using a jigsaw, punch or other cutting method. Two additional locating holes are made in the roof at predetermined positions around the opening 23.

A base element or upper clamping portion 18 is located on the outside of the roof with two spigots 19 on the base located in the additional holes protruding through the roof.

These spigots locate the base and lock it against the rotation. Another way to provide the location would be to provide a lip feature on the base element 18 which extends down from the base and fits and mates against the face of the opening 23. The spigots 19 may be rendered supplemental by such a lip feature.

The protruding shaft 4 of the assembled rotor and fan sub assembly 5 is located in the hole through the base element so that it protrudes into the vehicle interior. A plate or lower clamping portion 20 is then offered up inside the vehicle so that spigots 19 on the base 18 engage with it.

The whole device assembly is then held in place by placing and tightening a nut 40 on the bottom of the shaft. The shaft is shaped so that it cannot rotate in the hole 24 and bore whilst the nut is being tightened.

Whilst the embodiment of the invention shown in the figures and described above uses a nut on the shaft to fix the device, it is possible to have a fixing element separate from the shaft and/or use fixings arrangements other then a nut on the shaft. For example; the shaft could terminate short of the clamping portions and a separate fixing bolt could be incorporated in the base; the shaft or fastening bolt could feature a female thread form with a mating male thread from on the locking piece; or the shaft and locking component could use a bayonet type fitting rather than a threaded one.

Investigation has shown that the torque generated by the rotor at a given wind speed is more than sufficient to drive the fan at that rate of rotation. This indicates a possible route to increasing rate of extraction at a given wind/vehicle speed through the use of gearing:

1. The rotor and fan elements of the ventilator would be linked through a gearing arrangement rather than being integrated into the same sub-assembly. This would allow the fan to rotate at a greater angular velocity than the rotor, hence improving extraction performance at a given velocity.
2. Losses due to the gearing arrangement and any increase in torque to drive the fan will cause the rate of extraction to be less than predicted by an 'ideal' model, but the net gains will still be significant.
3. A range of gearing components could be offered for selection of the optimum gearing ratio dependent on the application.

The ventilator described operates on the Savonius principle and can be applied in a number of different applications including as a motive means for ships and for generating electricity. Although the ideas discussed within this document could be applied in these situations it is realised that it might be preferable to focus on the application to air extraction in vehicles.

What is claimed is:

1. A device for ventilation and/or air circulation comprising a fan, a rotor capable of being rotated by moving air for driving the fan and a fixing portion for fixing the device to a mounting surface, wherein the fixing portion comprises co-operating upper and lower clamping portions for respectively clamping above and below the mounting surface, the clamping portions being movable relative to each other to clamp or release a surface between them, and each comprising a hub portion connected by spoke elements to a peripheral clamping surface, and the fixing portion also comprising a clamping element passing through the respective hub portions for applying a clamping force to press the peripheral clamping surfaces about the mounting surface.

2. A device according to claim 1 wherein the clamping element is located substantially in the centre of the clamping portions.

3. A device according to claim 2 wherein the hubs of the respective clamping portions have co-operating or matching bores for receiving a common shaft or bolt and the clamping element moves or locks the clamping portions relative to each other along the common shaft or bolt.

4. A device according to claim 3 wherein the clamping element acts on or is movable along the lower end of the common shaft or bolt.

5. A device according to claim 4 wherein the fan and rotor rotate about an axis co-axial with the shaft or bolt passing through the clamping portions.

6. A device according to claim 5 wherein the fan and rotor rotate about the shaft or bolt passing through the clamping portions and the shaft is fixable relative to the fixing portion such that it does not rotate relative thereto.

7. A device according to claim 3 wherein the fan and rotor rotate about an axis co-axial with the shaft or bolt passing through the clamping portions.

8. A device according to claim 7 wherein the fan and rotor rotate about the shaft or bolt passing through the clamping portions and the shaft is fixable relative to the fixing portion such that it does not rotate relative thereto.

9. A device according to claim 1 wherein the hubs of the respective clamping portions have co-operating or matching bores for receiving a common shaft or bolt and the clamping element moves or locks the clamping portions relative to each other along the common shaft or bolt.

10. A device according to claim 9 wherein the clamping element acts on or is movable along the lower end of the common shaft or bolt.

11. A device according to claim 10 wherein the fan and rotor rotate about an axis co-axial with the shaft or bolt passing through the clamping portions.

12. A device according to claim 11 wherein the fan and rotor rotate about the shaft or bolt passing through the clamping portions and the shaft is fixable relative to the fixing portion such that it does not rotate relative thereto.

13. A device according to claim 9, wherein the fan and rotor rotate about an axis co-axial with the shaft or bolt passing through the clamping portions.

14. A device according to claim 13 wherein the fan and rotor rotate about the shaft or bolt passing through the clamping portions and the shaft is fixable relative to the fixing portion such that it does not rotate relative thereto.

15. A ventilating device according to claim 1 wherein the fan is a centrifugal fan.

16. A device according to claim 15 wherein the fan and rotor are coupled by a gearing arrangement.

17. A device according to claim 15 wherein the fan and rotor are a single piece.

18. A ventilating device according to claim 1 wherein the fan and rotor are fixed relative to each other.

19. A device according to claim 1 wherein the fan and rotor are coupled by a gearing arrangement.

20. A device according to claim 1 wherein the rotor comprises a base plate, an air scoop extending upwardly from the base plate comprising two curved rotor blades in spaced overlapping relation with their concave or partly concave surfaces in opposition to define a passage between the rotor blades.

21. A device for ventilation and/or air circulation comprising a centrifugal fan, a rotor capable of being rotated by moving air for driving the fan and a fixing portion for fixing the device to a mounting surface, wherein the fixing portion comprises co-operating upper and lower clamping portions for respectively clamping above and below the mounting surface, the clamping portions being movable relative to each other to clamp or release a surface between them, and each comprising a hub portion connected by spoke elements to a peripheral clamping surface, and the fixing portion also comprising a clamping element passing through the respective hub portions for applying a clamping force to press the peripheral clamping surfaces about the mounting surface, wherein the fan and rotor are a single piece fixed relative to each other, and wherein the rotor comprises a base plate, an air scoop extending upwardly from the base plate comprising two curved rotor blades in spaced overlapping relation with their concave or partly concave surfaces in opposition to define a passage between the rotor blades.

22. A device for ventilation and/or air circulation comprising a fan, a rotor capable of being rotated by moving air for driving the fan and a fixing portion for fixing the device to a mounting surface, wherein the fixing portion comprises co-operating upper and lower clamping portions for respectively clamping above and below the mounting surface, the clamping portions being movable relative to each other to clamp or release a surface between them, and each comprising a hub portion connected by spoke elements to a peripheral clamping surface, and the fixing portion also comprising a clamping element passing through the respective hub portions for applying a clamping force to press the peripheral clamping surfaces about the mounting surface, wherein the fan and rotor are coupled by a gearing arrangement, and wherein the rotor comprises a base plate, an air scoop extending upwardly from the base plate comprising two curved rotor blades in spaced overlapping relation with their concave or partly concave surfaces in opposition to define a passage between the rotor blades.

23. A device for ventilation and/or air circulation comprising a fan, a rotor capable of being rotated by moving air for driving the fan and a fixing portion for fixing the device to a mounting surface, wherein the fixing portion comprises co-operating upper and lower clamping portions for respectively clamping above and below the mounting surface, the clamping portions being movable relative to each other to clamp or release a surface between them, and each comprising a hub portion connected by spoke elements to a peripheral clamping surface, and the fixing portion also comprising a clamping element passing through the respective hub portions for clamping a clamping force to press the peripheral clamping surfaces about the mounting surface, wherein the rotor comprises a base plate, an air scoop extending upwardly from the base plate comprising two curved rotor blades in spaced overlapping relation with their concave or partly concave surfaces in opposition to define a passage between the rotor blades.

* * * * *